United States Patent
Thomann et al.

(10) Patent No.: US 9,867,234 B2
(45) Date of Patent: Jan. 9, 2018

(54) INDUCTION COOKING DEVICE FOR TEMPERATURE-CONTROLLED COOKING

(75) Inventors: Albert Thomann, Herisau (CH);
Andreas Vogel, Wattwil (CH);
Chirstian Fuchs, Buelach (CH)

(73) Assignee: GARLAND COMMERCIAL INDUSTRIES LLC, New Port Richey, FL (US)

( * ) Notice: Subject to any disclaimer, the term of this patent is extended or adjusted under 35 U.S.C. 154(b) by 1107 days.

(21) Appl. No.: 13/985,726

(22) PCT Filed: Dec. 28, 2011

(86) PCT No.: PCT/CH2011/000309
§ 371 (c)(1),
(2), (4) Date: Feb. 24, 2014

(87) PCT Pub. No.: WO2012/092683
PCT Pub. Date: Jul. 12, 2012

(65) Prior Publication Data
US 2014/0158678 A1    Jun. 12, 2014

(30) Foreign Application Priority Data
Jan. 7, 2011   (CH) .......................................... 34/11

(51) Int. Cl.
*H05B 6/12*   (2006.01)
*H05B 6/08*   (2006.01)
(Continued)

(52) U.S. Cl.
CPC ................. *H05B 6/06* (2013.01); *G01K 7/38* (2013.01); *G01K 15/005* (2013.01); *G01K 17/00* (2013.01);
(Continued)

(58) Field of Classification Search
CPC .. G01K 17/00; G01K 15/005; G01K 2207/06; G05D 23/20; G05D 23/26;
(Continued)

(56) References Cited

U.S. PATENT DOCUMENTS 3,781,506 A  * 12/1973  Ketchum ............... H05B 6/062
                                                         219/626
4,587,405 A     5/1986  Andre
(Continued)

FOREIGN PATENT DOCUMENTS

DE              3323399        1/1985
DE           102004033115      2/2006
(Continued)

OTHER PUBLICATIONS

Office Action dated Apr. 2, 2015 for corresponding Swiss patent application No. 00034/11 with English Summary, pp. 3.
(Continued)

*Primary Examiner* — Hung D Nguyen
(74) *Attorney, Agent, or Firm* — Ohlandt, Greeley, Ruggiero & Perle, L.L.P.

(57) ABSTRACT

The invention relates to a method for determining and regulating the temperature of an article with inductive properties which is heated inductively by means of an induction device, wherein the induction device contains an induction coil, means for producing an induction resonant circuit and a support element arranged above the induction coil and having a first side, which acts as support face for the article, and a second side, which is directed towards the inductive coil. At least one temperature sensor is fitted to the second side. The resonant frequency of the induction resonant circuit is measured via detection means and the temperature of the article is calculated from the measured resonant frequency, wherein the resonant frequency is (Continued)

related to the temperature of the article by virtue of a mathematical function, and the function is determined by determining at least two absolute temperature calibration values of the article at respectively different resonant frequencies. The temperature calibration values are calculated from temperature measured values of the sensor.

14 Claims, 3 Drawing Sheets

(51) Int. Cl.
*H05B 6/06* (2006.01)
*H05B 1/02* (2006.01)
*G01K 17/00* (2006.01)
*G05D 23/26* (2006.01)
*G01K 7/38* (2006.01)
*G01K 15/00* (2006.01)

(52) U.S. Cl.
CPC ........... *G05D 23/26* (2013.01); *H05B 1/0266* (2013.01); *H05B 6/062* (2013.01); *G01K 2207/06* (2013.01); *H05B 2213/07* (2013.01)

(58) Field of Classification Search
CPC ...... H05B 1/0266; H05B 1/0219; H05B 6/06; H05B 6/062; H05B 6/065; H05B 2213/07; H05B 6/086
USPC ....... 219/494, 495, 627, 667, 620, 621, 626, 219/660, 661, 663, 664, 666, 622; 374/101
See application file for complete search history.

(56) References Cited

U.S. PATENT DOCUMENTS

| | | | |
|---|---|---|---|
| 6,150,637 A | 11/2000 | Arroubi et al. | |
| 6,904,378 B2* | 6/2005 | Schilling | G05D 23/20 219/620 |
| 2004/0054486 A1* | 3/2004 | Schilling | G05D 23/20 702/99 |
| 2009/0252197 A1 | 10/2009 | Bonnel et al. | |
| 2012/0132646 A1* | 5/2012 | England | H05B 6/062 219/622 |
| 2012/0201267 A1* | 8/2012 | Patalay | G01J 5/0007 374/1 |
| 2013/0186091 A1* | 7/2013 | Effert | F01K 13/02 60/653 |

FOREIGN PATENT DOCUMENTS

| | | |
|---|---|---|
| EP | 1378807 | 1/2004 |
| EP | 1420613 | 5/2004 |
| GB | 2191024 | 12/1987 |
| GB | 2404293 | 1/2005 |

OTHER PUBLICATIONS

European Communication pursuant to Article 94(3) EPC dated May 8, 2015 from corresponding EP Application No. 11 808 561.2, 6 pages.

International Search Report dated Sep. 17, 2012 corresponding to International Patent Application No. PCT/CH2011/000309, 3pp.

English Translation of International Preliminary Report on Patentability and Written Opinion dated Jul. 10, 2013 corresponding to International Patent Application No. PCT/CH2011/000309, 18 pp.

* cited by examiner

Fig. 3a:
y-axis, left: Temperature/°C
y-axis, right: Derivative of temperature/°C/s
x-axis: Time/s Fig. 3b:
y-axis: Frequency/kHz
x-axis: Time/s

Fig. 4a:
y-axis, left: Temperature/°C
y-axis, right: Derivative of temperature/°C/s
x-axis: Time/s Fig. 4b:
y-axis: Frequency/kHz
x-axis: Time/s

INDUCTION COOKING DEVICE FOR TEMPERATURE-CONTROLLED COOKING

The invention belongs to the field of electrical devices for heating a utensil or pan, in particular, for restaurants. The invention generally relates to a method for determining the temperature of an article having inductive properties, which is heated by means of an electrical mechanism, a support element that forms a bearing surface for the article being disposed above the electrical mechanism.

Further, the invention relates to an electrical device for heating an article having inductive properties. The device contains an electrical mechanism for heating the article, [and]* a support element forming a bearing surface for the article, this support element being disposed above the electrical mechanism.

* Text in brackets is added for clarity.—Translator's note.

PRIOR ART

In professional food preparation, the temperature and the temperature control considerably influence the quality of prepared foods. For example, meat, fish and sauces must be prepared in a very narrow temperature range in the scope of a cooking process, so as to develop optimal flavor. Therefore, an optimal temperature control during the cooking of foods is very important. Here, cooking will be understood in the broader sense of preparing foods or food products for humans and animals by heating the food, such as, e.g., heating of liquids (for example, up to the boiling point), frying, roasting, stewing, braising, etc. When method steps according to the invention as well as enhancements or modifications thereof are described in connection with a cooking process in the following description, then this disclosure will apply in general to the heating of and/or keeping warm inductive articles, such as, e.g., utensils or pans that hold foods or food products.

An optimal and, in particular, also a regulated temperature control, however, is only obtainable when the cooking device can detect the temperature state of the bottom of the cooking utensil or pan as precisely as possible, without time delay and as continuously as possible during the cooking process, and e.g., can convey it to the user or can feed it into a control mechanism that controls the cooking process. In conventional thermal cooking zones on cooktops, the continuous detection or acquisition of the temperature of the bottom of the cooking pan is not known and the temperature control is based on the user's experience. One of the few cooking states in which the user obtains information on the temperature is, for example, the boiling point of water or an aqueous liquid.

It is basically possible to introduce temperature sensors underneath the cooking support, which is usually a ceramic or glass panel and which serves as a support for the cooking pan. These temperature sensors measure the absolute temperature of the underside of the cooking support. The measured temperature values, however, deviate to a greater or lesser extent from the actual temperature of the bottom of the cooking pan, depending on the thickness and the heat conductivity of the cooking support, as well as the dynamics of the cooking process relative to the temperature control. Therefore, the measured temperature values never correspond to the temperature of the pan bottom in certain phases of the cooking process, in particular, during the heating of the bottom of the cooking pan. A measuring of the temperature of the bottom of the cooking pan in real time is thus almost impossible.

This problem is also present in induction cooking devices, since here, in contrast to thermal cooking devices, the cooking pan is heated directly. The product to be cooked is heated in turn indirectly by the heated cooking pan, but with a certain time delay. The cooking support here, in contrast to a thermal cooking device, is not directly heated, but is heated only indirectly by thermal feedback or reflection of the cooking pan. If, in addition, the cooking support has thermally insulating properties, then the time delay by means of which the underside of the cooking support is heated is still greater. A control of temperature exclusively by measuring the temperature of the cooking support by means of the named temperature sensors is thus not very suitable and is at most suitable for cooking or keeping warm within a constant temperature range without large temperature shifts.

Induction cooking devices in a known way comprise an induction coil underneath the cooking support, by means of which an alternating magnetic field is produced. The alternating magnetic field in turn, among other things, induces eddy currents in the induction cooking pan, in particular in its bottom, which contributes to the heating of the cooking pan, in addition to hysteresis and magnetization losses. For generating the alternating magnetic field, the induction coil is part of a resonant circuit, which is driven via switching. Further, it is also known to provide, underneath the cooking support in the region of the induction coil, a measuring instrument with a measuring coil, by means of which an induction measuring resonant circuit is produced, which interacts with the cooking pan. This measuring resonant circuit is characterized by a resonant frequency which is dependent, among other things, on the permeability or inductivity of the cooking pan. The permeability of the cooking pan in turn is dependent on the temperature of the cooking pan that is heated. The relationship between resonant frequency and temperature of the cooking pan, in particular of its bottom, can be represented by a linear function for the relevant temperature range. A temperature-controlled cooking process can be implemented with this method. However, with the measuring of resonant frequency, only relative temperature values can be determined, but not absolute values. Further, the linear relationship between resonant frequency and temperature of the cooking pan is also dependent on its inductivity, i.e., permeability, which the user of the induction cooking device usually does not know. That is, the named physical relationship is reflected by different linear characteristics, e.g., with different slopes, depending on the nature of the cooking pan.

Proceeding from this initial position, a method is known, by means of which the induction cooking pan is subjected to a calibration process prior to its first-time use. The aim of this calibration process is to determine at least two absolute temperature calibration values for the respective induction cooking pan, by means of which the linear characteristic or function can be defined. Since the linear characteristic, as mentioned, is nearly linear, at a minimum, two measured temperature values that lie as far away from each another as possible are necessary in order to determine it. The temperature calibration values for the induction cooking pan can be acquired, for example, by means of one or more temperature sensors introduced on the underside of the cooking pan support. Since the temperature sensor reproduces the temperature of the cooking pan or the bottom of the cooking pan with a time delay for the reasons given above, for the determination of a temperature calibration value, the temperature of the cooking pan must be maintained at a constant level for a certain amount of time, so that the support element can take on the temperature of the induction cooking pan in the region of the temperature sensor.

The first temperature calibration value is usually measured at the beginning of the heating process, when the temperature of the induction cooking pan has already taken on, for example, a constant ambient temperature. In this way, one uses for the first temperature calibration value, an equilibration between the temperature of the induction cooking pan and the cooking pan support in the region of the temperature sensor. The subsequent temperature calibration values, however, are acquired each time after corresponding heating steps. The linear characteristic or function for the respective induction cooking pan is now determined by means of the temperature calibration values and is stored in the induction cooking device. With a later use of the already calibrated pan, the user of the induction cooking pan only needs to identify the induction cooking pan for the induction cooking device and the induction cooking device searches for the linear characteristic belonging thereto in order to execute a temperature-controlled cooking.

This method, however, has the disadvantage that each induction cooking pan must be registered in the induction cooking device prior to use. This procedure is relatively cumbersome and, in particular, leads to unnecessary delays, erroneous identification of the cooking pan, and consequently to poorer cooking results during the hectic operation of a professional kitchen. In addition, for an error-free operation of the kitchen, the personnel must be correspondingly instructed and trained. A large disadvantage of the method, however, also lies in the fact that the determination of the temperature calibration values upon first-time use of the pan must be made with the induction cooking device independently from the cooking process, e.g., prior to cooking. Therefore, this means that the temperature of the induction cooking pan must be kept constant during the waiting period up to when the temperature of the support element has equilibrated with the temperature of the induction cooking pan. This would very much hinder the cooking process, in that the determination of the temperature calibration values cannot be carried out during the cooking process. An additional calibration of the induction cooking pan in a separately conducted calibration process also means, however, an additional expense.

PRESENTATION OF THE INVENTION

Therefore, an object of the present invention is to propose a method for determining and regulating the temperature of an article, and, in particular, a method for the calibration of an induction utensil or pan in the scope of the named method. Further, it is also an object of the present invention to propose an induction cooking device for the continuous determination and regulation of the temperature of an induction cooking utensil or pan during a cooking process according to the above-named method. An object of the invention will be that the user does not need to calibrate the induction utensil or pan prior to first-time use and also each time prior to repeated use in an independently conducted calibration method. Further, it is also an object of the invention that the user does not need to identify the induction cooking pan relative to the induction device prior to each repeated use.

The dependent claims comprise preferred enhancements and embodiments of the invention. The method features according to the description also apply to the device according to the description and vice versa. The features of the method and the device according to the invention refer in particular to the temperature calibration of induction pans having different inductivities.

Since the method according to the invention generally relates to induction devices by means of which articles are heated, the scope of protection shall not be limited to an induction cooking device operated with an induction cooking utensil or pan.

Thus, according to the method of the invention, for the determination of the temperature of the article, the temperature-dependent permeability of the article or the resonant frequency of an induction measuring resonant circuit that is dependent on this permeability is measured, and the absolute temperature of the support element is measured by means of at least one temperature sensor introduced on the support element, whereby the relationship between the temperature and permeability or resonant frequency of the article is determined directly or indirectly from the measured absolute temperature values, and the absolute temperature of the article is determined continuously from the measured permeability values or resonant frequencies via the relationship derived from the measured absolute temperature values.

The electrical mechanism is particularly designed for the inductive heating of the article. The electrical device associated therewith is preferably an induction device. The electrical mechanism preferably comprises means for generating an induction resonant circuit, such as, e.g., an induction coil, for purposes of inductive heating of the article. The electrical device can also be a conventional thermal device having, for example, a heating coil, by means of which the support element is heated, which in turn heats the article lying on it. The measurement of the permeability or of said resonant frequency of the article may thus be produced independently from the heating method.

The support element disposed above the electrical mechanism preferably comprises a first side, which serves as the bearing surface for the article, and a second side, which is facing the electrical mechanism. The at least one temperature sensor is preferably disposed on the second side.

In a preferred enhancement of the invention, the resonant frequency of an induction measuring resonant circuit interacting with the article is measured via a measuring instrument. The temperature of the article is calculated from the measured resonant frequency. As mentioned, the resonant frequency stands in a physical relationship with the temperature of the article via a mathematical function, the mathematical function containing the temperature (T) and the resonant frequency (F) as variables. This function is now defined by determining at least two absolute temperature calibration values of the article for different resonant frequencies in each case, at least one temperature calibration value of the article being determined by the following steps:

heating the article to a higher temperature level and keeping the temperature constant at this level;

at least a one-time measuring of the temperature of the support element by the at least one temperature sensor at a time point in which the temperature is kept constant at the higher temperature level;

calculating the temperature calibration value, whereby the calculation is based on a linear, time-invariant system (LTI system), by means of which the temperature calibration value is calculated as the output variable of a transfer function of the LTI system from at least one temperature value measured by the temperature sensor on the support element as the input variable of the transfer function.

In a preferred enhancement of the invention, the temperature calibration value is determined on the basis of several measured temperature values by the following steps:
heating the article to a higher temperature level and keeping the temperature constant at this level;
measuring the temperature of the support element several times by the at least one temperature sensor over a time period in which the temperature is kept constant at the higher temperature level;
calculating the temperature calibration value, whereby the calculation is based on a linear, time-invariant system (LTI system), by means of which the temperature calibration value is calculated as the output variable of the transfer function of the LTI system from several temperature values measured by the temperature sensor on the support element at distinct time intervals in time as the input variables of the transfer function.

The increase in the temperature of the article is preferably present in the form of a step function, so that the at least one temperature measured on the support element by the temperature sensor corresponds to the step response to the step function. The transfer function is particularly preferably a step response in the form of a PT1-element. The step response may also be present, however, in the form of a PT2-element, which makes the calculation of the temperature calibration value considerably more cumbersome and also imprecise. Temperature calibration values are thus preferably determined by increasing the temperature of the article abruptly from a first temperature level to a second, higher temperature level, and thereafter keeping it constant.

The temperature calibration value, which corresponds to the final value of the step response, is preferably calculated from measured temperature values that correspond to the input variables of the step response, calculated before the final value of the step response is reached. A great advantage of the method according to the invention thus lies in the fact that one no longer has to wait for the final temperature value of the step function for the determination of the temperature calibration value.

The final value of the step response is preferably determined from a plurality of measured temperature values by an approximation method. The approximation method may be an iteration method, for example. Preferably, the approximation method is a method according to the method of least squares, as will be explained in more detail below.

In a preferred enhancement of the invention, the temperature calibration value is calculated repeatedly over a time interval according to the above-named procedure from the previously measured temperature values of the temperature sensor in each case. The greater the number of measurement values available for the calculation, the more precise the temperature calibration value can be calculated. The calculations are preferably continued with an increasing number of measured temperature values until they result in a temperature calibration value that is sufficiently precise, and approximated to the output variable or the final value of the transfer function.

Keeping the temperature of the article constant subsequent to a temperature increase is preferably carried out by keeping the resonant frequency constant via a control loop. In the control loop, the resonant frequency is controlled via the power output to the induction resonant circuit. That is, the temperature of the article and thus its resonant frequency are controlled via the power output to the induction resonant circuit.

A calibration process appropriately comprises several calibration steps executed sequentially directly or indirectly, in which a temperature calibration value is determined in each calibration step. If a temperature step is based each time on the individual calibration steps, then several calibration steps executed subsequently directly result in a step-shaped temperature curve.

In a preferred enhancement of the invention, several temperature calibration values are determined, which are drawn on for determining the relationship between the temperature of the article and the resonant frequency, which is defined by the mathematical function. This mathematical function is preferably determined via an approximation method. As mentioned initially, the mathematical function itself usually corresponds to a simple linear relationship between the temperature of the article and the resonant frequency. In this case, the determination of two temperature calibration values can be sufficient for determining the function without having to employ an approximation method.

The temperature calibration values are preferably determined during the heating of the article, preferably at the beginning of heating the article. Once the calibration values have been established and once the mathematical function that determines the relationship between the temperature of the article and the resonant frequency has been defined, then the determination and regulation of the temperature of the article are henceforth carried out via the regulation of the resonant frequency. On the one hand, the temperature of the article can be determined via the measurement of the current resonant frequency almost in real time and, for example, can be conveyed to the user via an optical or acoustic indicator. Further, after terminating the calibration process, the temperature can be controlled almost in real time via the resonant frequency. The resonant frequency and thus the temperature of the article are regulated via the electrical power introduced into the induction resonant circuit. The control variable, thus the temperature or resonant frequency, is based on preset default values. These preset values, for example, may be temperature values or temperature curves input by the user via an input unit. However, the preset values may also be stored as data values in a data memory of the induction device. Thus, e.g., the user can read into the induction device the temperature values, for example, for a cooking process or a complete program, such as a cooking program, via the input unit. Further, however, programs such as cooking programs that are stored in a memory of the induction device can also be stored with data on the temperature control.

Subsequently, the execution of the calibration method or the calibration steps can be represented based on a concrete calculation method. A step function in the form of an abrupt temperature increase to which the temperature of the support element reacts with a step response in the temperature sensor is based on the calibration steps in each case.

The step response of a PT1-element is described by the following equation:

$$y(t) = K\left(1 - e^{\frac{-t}{T}}\right) \quad \text{Equation 1}$$

The step response is defined by the two parameters K and T. The amplification or gain factor K defines the final value of the step response and the time constant T defines the speed at which the final value is obtained. A PT1-element applies particularly when the object lies directly on the support element, at least in that region in which the temperature sensor is fastened to the support element, and, in particular, there is no air cushion between support element and article.

If the article does not lie directly on the support element in the region of the temperature sensor, and, for example, there is still an air cushion present in between, then this leads to a delayed heat conduction due to the heat-insulating properties of the air cushion. The step response has the form of an aperiodic PT2-element due to this delay. The step response of such a PT2-element is described by the following equation:

$$y(t) = K - \frac{K}{T_1 - T_2}\left(T_1 e^{-\frac{t}{T_1}} - T_2 e^{-\frac{t}{T_2}}\right) \quad \text{Equation 2}$$

Preferred, however, is an arrangement in which the step response is a PT1-element. If precise measured temperature values are available for the step response of a PT1-element, then the temperature calibration value can be calculated even prior to when the final temperature value of the step response is obtained. In this way, a more rapid calibration of the system is achieved, since one need no longer wait until the step response has reached its final value. Thanks to this optimization in time for the calibration step, the calibration process can be integrated into the cooking process, since the temperature effect of the cooking process is reduced to a negligible extent by the now considerably shortened calibration steps.

Theoretically, the parameters K, T of the step response of a PT-1 element are determined by two measured temperature values Since the measured temperature values, however, each have a measurement error, more than two measured temperature values are determined for a sufficient precision. Proceeding from these measured temperature values, the parameters K, T are calculated by means of an approximation method. This approximation method can be an iteration method, for example. That is, the end value of the step response is determined from current measured temperature values by an iteration method before the support element has reached the final temperature value of the step response.

According to a preferred embodiment of the invention, the final temperature value, i.e., the temperature calibration value is determined via an approximation method according to the method of least squares. In an approximation according to the method of least squares, the parameters of a preset model function are dimensioned such that the squares of the variations of all measured values are minimal. This method is particularly suitable for measurement values that are normally distributed, which can be considered in the case of a measured step response each time. Since Equation 1 for the PT1-element is a nonlinear model function, however, it must first be converted to a linear function by means of suitable substitution. Now, if a suitable substitution can be found for the step response according to Equation 1, the step response must be derived first. The derivation of the PT1-element step response corresponds to the following function:

$$y'(t) = \frac{K}{T} e^{-\frac{t}{T}} \quad \text{Equation 3}$$

with the substitution:

$$z(t) = \ln(y'(t)) \quad \text{Equation 4}$$

one obtains the linear function:

$$z(t) = \ln\frac{K}{T} - \frac{t}{T} \quad \text{Equation 5}$$

The substitution is only reliable for positive derivatives of the step response. The two parameters:

$$x_0 = \ln\frac{K}{T} \quad \text{Equation 6}$$

$$x_1 = -\frac{1}{T} \quad \text{Equation 7}$$

can now be calculated with the method of least squares according to the following equation:

$$x_0 = \bar{z} - x_1 \bar{t} \quad \text{Equation 8}$$

$$x_1 = -\frac{\left(\sum_{i=1}^{n} t_i z_i\right) - n\bar{t}\bar{z}}{\left(\sum_{i=1}^{n} t_i^2\right) - n\bar{t}^2} \quad \text{Equation 9}$$

The following is valid for the arithmetic mean:

$$\bar{t} = -\frac{1}{n}\sum_{i=1}^{n} t_i \quad \text{Equation 10}$$

Now, as has already been mentioned, if the step response of the system corresponds to a PT1-element, then the parameters K and T approximate a final value according to several measurement points. The two parameters T and K can now be calculated from Equation 6 and Equation 7. In this method, it is important that the first measurement point y'(t) lies at the time point of t=0.

In order to calculate the parameters T and K according to the method explained above, as mentioned, the step response must be derived. This can be calculated at the time point t by an approximation with the method of least squares and a linear model function according to the following formula:

$$y'(t) = -\frac{\left(\sum_{i=-k}^{k} t_i y_i\right) - (2k+1)\bar{t}\bar{y}}{\left(\sum_{i=-k}^{k} t_i^2\right) - (2k+1)\bar{t}^2} \quad \text{Equation 11}$$

In order to obtain a precision for the derivative that is as high as possible, a regular acquisition of measurement values (temperature and resonant frequency) over time is important. The measurement values can be measured, e.g., in intervals of one second. With a rapidly reacting system, the derivative can be determined from fewer measurement points than in a slowly reacting system while maintaining the same precision. It is understood, of course, that other algorithms can also be considered for forming the derivative.

Different operating states of the induction device require different applications of the above-described algorithm. In the foreground is the determination of two temperature calibration values lying as far apart from one another as possible, based on two resonant frequencies also lying correspondingly far apart from one another.

In general, the automatic calibration process begins with the start of a heating process or cooking process and the recognition of an inductive article or cooking utensil or pan on the support element or cooking zone.

In order to establish temperature calibration values, the article is heated each time to a stable temperature or kept at this temperature, which is characterized by a constant resonant frequency of the resonant circuit. The calibration process or a calibration step first begins when a stable, i.e., constant resonant frequency has been established, and consequently the temperature of the article or the cooking pan is constant. It is understood, of course, that primarily that region of the article or of the pan which is in thermally conducting contact with the support element must have a constant temperature. This is, for example, the bottom of the pan. The calibration process starts with the introduction of the first calibration step. A calibration step can be produced, e.g., by heating the article to a first, higher temperature level. This may involve the first, second, or a further calibration step.

If a calibration step is based on the heating of the article to a higher temperature level, then the beginning of this calibration step is characterized by the acquisition of temperature measurements by means of the temperature sensor or with the acquisition of the evaluation of the currently measured temperature values, after the resonant frequency belonging to the article is again stable, i.e., after the temperature of the article is stable at the higher temperature. Measured temperature values are now determined continuously, from which final temperature values are calculated continuously over a period of time.

Since only a few measured temperature values are present at the beginning of the calibration step, the statistically distributed measuring precision impacts the calibrated final value to an essentially greater degree. With increasing number of measurement points along the step function and approximation of the measured temperature values by continuous heating of the support element, at the final temperature, the calculated final temperature also approximates ever more closely the effective final temperature of the step function. That is, with progressing temperature measurement, the calculated final temperatures level off at the effective final temperature, which corresponds to the final value of the step function. Now, as soon as the calculated final values have been approximated sufficiently close to the effective final temperature, the first calibration step is terminated by adjusting the measurement of the temperature or the evaluation of the measured temperature values. The calculated final temperature is assigned to the resonant frequency based on this as the first, second, or further calibration variable. The termination of the calibration step clearly occurs at a time prior to the time point at which the support element has reached the final temperature, thus the effective calibration temperature.

After conclusion of this calibration step, the article is heated by corresponding output power to the induction resonant circuit for purposes of introducing a further calibration step, preferably to the next higher and constant temperature level. The further calibration step is first introduced analogously to the preceding calibration step, when the article has reached a constant temperature, and the resonant frequency of the resonant circuit is correspondingly stable. As soon as this time point has been reached, the final temperature is calculated in an analogous way to the preceding calibration step. The calculated final temperature of the further calibration step is assigned to the resonant frequency that is the basis for it as a further calibration value. Theoretically, the acquisition of two calibration values is sufficient for defining the linear characteristic between temperature and resonant frequency of the article. However, since the determined calibration values are each associated with a certain imprecision, the establishment of the linear characteristic from only two calibration values is also associated with a certain imprecision. This applies, in particular, when the calibration values lie close to one another, which may be the case, for example, in the acquisition of calibration values directly following one another during a heating process, as described above.

Therefore, preferably more than two calibration values are determined. Basically, a plurality of calibration values can be determined during a heating process. The more calibration values are available, then the more precise the linear characteristic derived therefrom can be. However, if more than two calibration values are used for determining the linear characteristic, then the determination of the linear characteristic is appropriately conducted via an approximation method. This can be the method of least squares, for example.

The calibration process can be concluded as soon as sufficient calibration values are present. The duration of the calibration process and the number of determined calibration values associated therewith can be established individually and sometimes depends on the required precision of the determined linear characteristic as well as on the course of the heating or cooking process. It can also be provided, of course, that the calibration process can be repeated during a cooking process, for example, in order to complement the calibration values determined from the preceding calibration processes with additional calibration values, in order to increase the precision of the linear characteristic. In this way, the precision of the temperature control continually increases during the cooking process.

Since the individual calibration steps are terminated each time prior to reaching the step response, the time delay that ensues is negligibly small when the temperature of the article must be kept constant during a calibration step. The stepped heating process resulting from the calibration process thus does not deviate considerably when there is a continuous and rapid heating, which is usually desired. Since the calibration process or the individual calibration steps do not especially disrupt the temperature control during the cooking process, the calibration process may be of any length and often will be conducted randomly during the cooking process.

If a calibration process cannot be executed in a certain phase of the cooking process due to the preset temperature control (e.g., during rapid and intense heating), then the calibration will be made at a time period during the cooking process in which the preset values allow a calibration process for the temperature control.

It may also happen that the linear characteristic changes in the course of the cooking process, e.g., due to increase of the internal temperature of the device. In this case, it may be provided that the induction device, e.g., the temperature of the device, can be continuously monitored and the calibration values corrected if necessary or they can be newly determined by introducing a new calibration process.

The first calibration value can be acquired in different ways depending on initial conditions. For example, if the article and the support element are at a stable ambient temperature prior to introducing the cooking process, then the first calibration step can be conducted by the induction device prior to the first heating. In this case, the first temperature calibration value can be determined without executing the above-described calibration step and is found simply by determining the temperature of the support element by the temperature sensor and determining the resonant frequency of the article belonging to it. Of course, it must be assured that this calibration value only occurs at a stable resonant frequency, i.e., a stable temperature of the article. The second calibration step for determining the next calibration value is carried out on the basis of a temperature step of the article in the described manner.

According to other, stored initial conditions, the support element is heated, for example, due to a preceding cooking process, while the article has a lower temperature than the support element. In this case, the temperature of the article is kept constant by appropriate power control. The support element is now cooled to the temperature of the article, which corresponds to a step function with negative sign. Therefore, the derivative y'(t) must be multiplied by −1 prior to the calculation. The second calibration step for determining the next calibration value is also carried out here on the basis of a temperature step of the article in the above-described manner.

According to another initial situation, due to a preceding heating, the article has a higher temperature than the support element, the latter being at ambient temperature, for example. This may be the case, e.g., if the cooking pan has already been used in a preceding cooking process. In this case, the resonant frequency and thus the temperature of the article can be kept constant by corresponding control of the power input. As soon as a stable resonant frequency is measured, the calibration step can be introduced, as described above. The second calibration step for determining the next calibration value is also carried out here on the basis of a temperature step of the article in the above-described manner.

According to another initial situation, both the article as well as the support element are already heated prior to uptake of the cooking process, when compared to ambient temperature. This initial situation may be caused, e.g., by a preceding cooking process. In this case, the resonant frequency and thus the temperature of the article can be kept constant by corresponding control of the power input. As soon as a stable resonant frequency is measured, the calibration step can be introduced, as described above. The second calibration step for determining the next calibration value is also carried out here on the basis of a temperature step of the article in the above-described manner.

The calibration steps then disrupt the actual heating or cooking process the least when the heating provided has a small gradient or the temperature is kept almost constant. The control means of the induction device may thus be designed so that the calibration process is conducted with small temperature changes during a cooking phase, so that it influences the temperature control as little as possible.

The invention also relates to an electrical device for the inductive heating of an article with inductive properties containing an electrical mechanism for the inductive heating of the article, a support element being disposed above the electrical mechanism, with a first side which serves as a bearing surface for the article, and a second side which is facing the electrical mechanism, and onto which at least one temperature sensor is introduced. The one or more temperature sensors are placed in a region of the support element where the article to be heated lies on the support element. This region is a cooking zone, for example. The electrical mechanism preferably comprises means for generating an induction resonant circuit, in particular, an induction coil.

For executing the above-described calibration process as well as for determining and regulating the temperature of the article, a measuring instrument is provided for the preferably continuous determination of the temperature-dependent permeability of the article, or of the resonant frequency dependent on it, of an induction measuring resonant circuit interacting with the article. The measuring instrument for measuring the resonant frequency appropriately contains a measuring coil. The measuring coil may be a coil that is independent from the induction coil for generating the induction heating power. It is also possible, however, that the measuring coil corresponds to an induction coil provided for generating the induction heating power. For executing a measurement with the measuring coil for purposes of acquiring said resonant frequency, the induction coil for generating the induction heating power is deactivated during the measuring phase, so that there is no mutual interference of the alternating magnetic fields. Since such a measurement usually lasts only a fraction of a second, this measure does not adversely affect the heating process. Further, a control loop is provided with corresponding programming means, by means of which the introduction of electrical power for exciting the induction resonant circuit can be regulated in such a way that the resonant frequency of the induction measuring resonant circuit and correspondingly, the temperature of the article can be regulated to preset default values.

The induction device according to the invention contains corresponding control and programming means for execution of the method according to the invention. In a preferred enhancement of the invention, the induction device contains means, such as control means, programming means, by means of which the calibration process can be executed automatically. That is, the user does not need to initiate the calibration process himself when initiating the cooking process. Rather, the control means of the induction device automatically initiate the calibration process. Said control means, for example, can initiate the calibration process during the initializing of a cooking process and during the identification of an article, such as a cooking pan, on the support element, such as a cooking zone. In a preferred enhancement, the named means can also conduct the calibration process as long as it is necessary (number of calibration values) and repeat it as often as possible without needing the intervention of the user.

The control preferably contains programming means that adapt the execution of the calibration steps to the course of the step response by means of corresponding algorithms. If the step function reaches the final value in a short time, then relatively few measurement values are sufficient and the calibration process is relatively brief. If the step function reaches the final value relatively late, then more measurement values are necessary and the calibration process lasts correspondingly longer.

Additional programming means with corresponding algorithms can be provided, which determine whether the temperature change at the support element is produced rapidly or slowly, and consequently whether the step response corresponds to a PT1-element or a PT2-element. This makes it possible, for example, to exclude step responses that do not correspond to a PT1-element and thus supply imprecise calibration values. The course of the step response can be determined, e.g., by means of deriving the step function.

It is self-explanatory that the named programming means for conducting the method according to the invention as well as in general the regulation and control of the temperature monitoring are executed using electronic data-processing means, e.g., microprocessors.

As has already been mentioned above, the product that is found in an induction utensil or pan and is to be heated is raised also to the higher temperature level of the pan with a time delay relative to the induction pan and, in particular, to the bottom of the pan. An increase in the temperature correspondingly also always causes an increase in the power output of the electrical mechanism or of the induction device, in order to also raise, in addition to the induction pan, the product found in this pan, to the corresponding temperature level. The power to be output for this purpose and the time course of the power output are dependent on the quantity, the nature, and the physical properties of the product, such as, e.g., the heat capacity or the required thermal energy for the change in temperature.

In connection with the invention named above, it has now been recognized that the increase in the temperature of the pan, e.g., in the form of a step function, triggers a step response of the power output of the system due to the time-delayed heating of the product that is to be heated in the pan. The step response is characterized by the fact that when a temperature step is introduced in the pan, the power output is also increased. The level of the output power is defined by the power requirement that is necessary in order to keep the temperature of the pan or the bottom of the pan at the higher temperature level. Therefore, directly after executing the temperature step to the higher temperature level, a relatively high power output is necessary, since a great deal of thermal energy is drawn off from the pan or the bottom of the pan into the product that is still at a lower temperature. The closer the temperature of the product approximates the temperature of the pan or the bottom of the pan, the less power is needed in order to maintain this higher temperature. Once the product found in the pan reaches the temperature of the pan or the bottom of the pan, subsequent to the step response, a constant power output is adjusted to a lower level relative to the power output during the step response. The named step response can be a PT1-element, for example.

The product is preferably a product to be cooked, which is subjected to a cooking process in a cooking pan. The product preferably comprises food or food products. The time course of the power output as well as the total power that is output during the step response now provide information on the thermal energy taken up by the product to be heated and thus the quantity, the nature, and the properties of the product. If, for example, a small amount of product is in the pan and/or the product has a relatively small heat capacity, then the total power output is smaller and the step response is shorter than when, e.g., a great deal of product is found in the pan and/or the heat capacity of the product is high.

Proceeding from the information obtained on the power output, the power output during cooking, particularly during temperature-controlled cooking, for example, can be controlled or regulated in a targeted manner. If, for example, based on the information determined with the method according to the invention named above, it is known that relatively little power is necessary in order to heat the product to be cooked, since, e.g., only a small amount of product to be cooked is present in the cooking pan, and/or it has only a small heat capacity, then the power output can be metered correspondingly with care, in order to avoid, for example an "overshooting" of the energy input and the temperature increase associated with this in the product to be cooked.

If, however, based on the above-named method, it is known that a relatively high power is necessary in order to heat the product, since, e.g., a large amount of product is in the pan and/or it has a high heat capacity, or much thermal energy is necessary for the change in temperature, as is the case for thawing, the power output then can be set correspondingly high, in order to assure that the product reaches an aimed-at set-point temperature or state as rapidly as possible. In this way, for example, it is prevented that it will remain too long at a low power output until the product has reached the aimed-at set-point temperature.

The method according to the invention for determining information on the necessary thermal energy or power for heating the product at a specific temperature can be integrated into the above-named calibration or temperature measurement method. That is, the above-mentioned step function for determining temperature calibration values can also be used simultaneously for the purpose of acquiring and evaluating the step response of the power output.

The step function for determining the step response of the power output is also reached here preferably via an abrupt increase and regulation of the resonant frequency of the utensil or pan, as described above. For further details in this regard, refer to the corresponding statements for the temperature calibration. The method according to the invention for determining information on the necessary thermal energy or power for heating the product, moreover, can also be called upon for an increase in the precision and/or speed of the temperature calibration method according to the invention.

The method according to the invention may also be used, however, independently from the above-described temperature calibration method or temperature measurement method.

Beyond this, it is also possible to repeat the determination of the capacity for absorption of thermal energy or the power output associated therewith during a heating process, in particular, a cooking process, in order to calculate, for example, a heat capacity and/or quantity of the product to be cooked that changes during the cooking. Thus, for example, when a product is being thawed, essentially more thermal energy is necessary in order to increase the temperature than in the case of an already thawed product. Further, if, for example, a liquid product to be cooked is cooked down or reduced, then the capacity for absorption of thermal energy changes continuously with each temperature change.

The acquisition and evaluation of the above-named information on the power output or the absorbed thermal energy can be conducted as a function of a temperature increase via corresponding electronic data-processing means. Further, corresponding control or regulating means for regulating the power output during the heating of the product are preferably provided, taking into consideration the information obtained above.

The induction device may be any device operating by induction for heating an article interacting with the induction device. The article with inductive properties is preferably a utensil, in particular a cooking pan, for cooking, heating or keeping food or food products warm. A good heat contact between pan and support element acts positively on the calibration speed as well as the precision of the calibration values. The induction device is preferably an induction cooking device.

The support element is preferably a glass, ceramic, or glass-ceramic panel, which is composed of a Ceran glass, for example. One or more induction coils that define cooking zones corresponding to the support element can be disposed underneath the support element. That is, several cooking zones may lie in the region of the support element. Correspondingly, the induction cooking device may also contain several cooking zones. The method according to the invention can preferably be executed for each cooking zone individually and independently.

The induction device and if need be, the induction utensil as well as the method according to the invention may also find use, however, very generally for the temperature-controlled heating of articles contained in an induction utensil. Temperature-controlled heating in this case may have the purpose of thawing the article, keeping it warm, or it may be a cooking process according to the preceding definition.

However, the invention is preferably used for temperature-controlled cooking on induction cooking devices with contact-free temperature measurement and temperature control in real time, as this is known, among other things, under the name RTCS®—"Realtime Temperature Control System". Thanks to the present invention, the temperature calibration of the induction utensil used no longer needs to be acquired separately prior to use. The temperature calibration is conducted rather at the beginning of or during the cooking process, and the cooking process itself would not be hindered by the calibration process. Moreover, the temperature calibration according to the invention can be repeated as often as desired during the cooking process, or as many temperature calibration values as desired can be determined in the scope of the calibration process, in order to thus continually obtain a more precise linear characteristic for the relationship of resonant frequency and temperature in the on-going cooking process. Moreover, in the case of repeated use, the utensil or pan does not need to be identified each time prior to use so that the calibration values stored in the induction device and typical for each pan must be read into the calculation and control unit prior to the cooking process. Since the temperature calibration according to the invention does not essentially influence the temperature control of the on-going cooking process, the respective utensil or pan is not newly calibrated again for each use. In this way, the identification of the utensil or pan and recourse to stored calibration results can be eliminated, as mentioned above. The user does not need to think about the cooking pan used and its calibration.

As already mentioned above, however, the invention shall not be limited to the field of cooking and keeping warm or heating food or food products. The invention shall also find application in other fields in which articles lying on a bearing surface are heated via induction, and the temperature of the article shall be controlled as much as possible in real time.

PREFERRED EMBODIMENTS OF THE INVENTION

In the following, the subject of the invention is explained in more detail based on the figures. Here, schematically:

FIG. 3b shows a representation of the resonant frequency for the step response according to FIG. 3a;

FIG. 4b shows a representation of the resonant frequency for the step response according to FIG. 4a.

Figure 1:
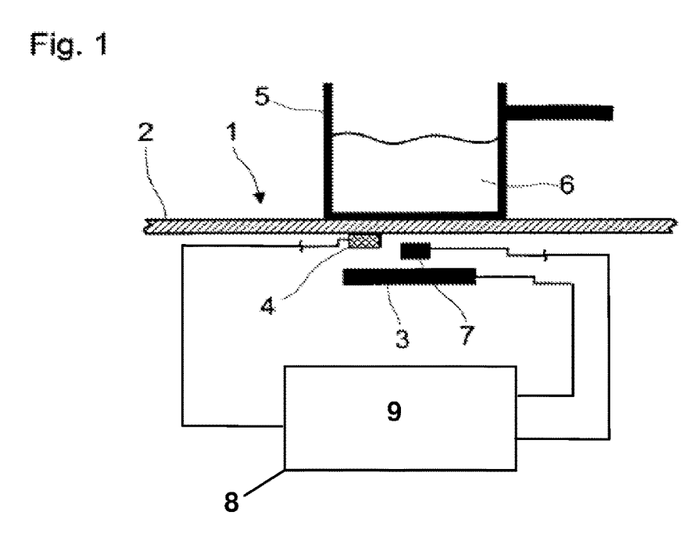
FIG. 1 shows a representation of the cooking zone of an induction cooking device.

A schematic arrangement for conducting the method according to the invention is shown in FIG. 1. An induction cooking device 1 comprises an induction coil 3 disposed underneath a glass-ceramic panel 2 for the heating of a cooking utensil 5, here a pan and its contents 6 above the pan. A temperature sensor 4 for measuring the temperature of the glass-ceramic panel 2 is disposed on that side of the glass-ceramic panel 2 facing the induction coil. Basically, several temperature sensors may also be provided for each cooking zone. For conducting the calibration process, for example, the induction device can select the one or more optimally suitable temperature sensor(s). The other sensors can be ignored. Whether a temperature sensor is suitable depends on whether the cooking pan also actually lies above this temperature sensor, and whether the cooking pan lies in the region of the temperature sensor in question in a good heat-conducting manner relative to glass-ceramic panel 2. The inclusion or the evaluation of the measured temperature values from several temperature sensors placed at different sites improves the reliably and stability of the method. Further, the measuring coil 7 of the measuring instrument for the measurement of the resonant frequency of an induction measuring resonant circuit is also disposed underneath the glass-ceramic panel 2 in the region of the induction coil 3. A controller or microprocessor 8 can have an algorithm 9 resident thereon, to perform the control functions and calculations described herein.

Figure 2:
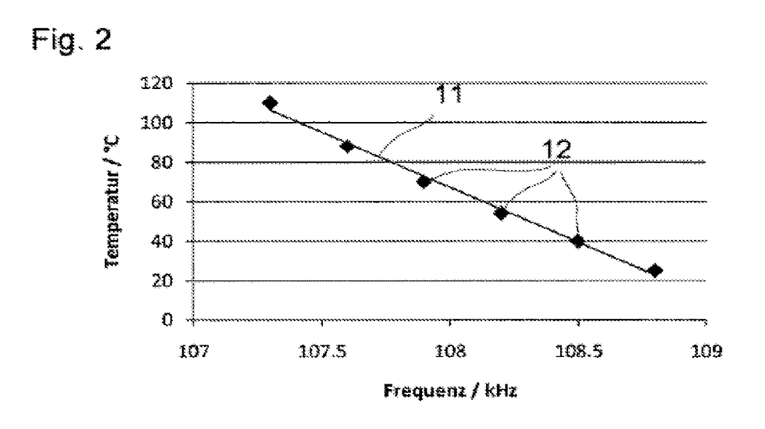
FIG. 2 shows the graphic representation of the linear characteristic between the temperature of the article and the resonant frequency of an induction measuring resonant circuit.

FIG. 2 shows a graph, in which temperature calibration values 12 determined for specific resonant frequencies are plotted. The linear characteristic 11 or the linear function belonging to it was determined from the calibration values 12 that were obtained via an approximation method. The more precise the calibration values 12 are, the closer these lie to the linear characteristic 11. The objective of the automatic temperature calibration is ultimately always to recognize as rapidly as possible the linear relationship between the temperature and the resonant frequency. As soon as this relationship has been determined with sufficient precision, a temperature-controlled cooking is possible.

Figure 3A:
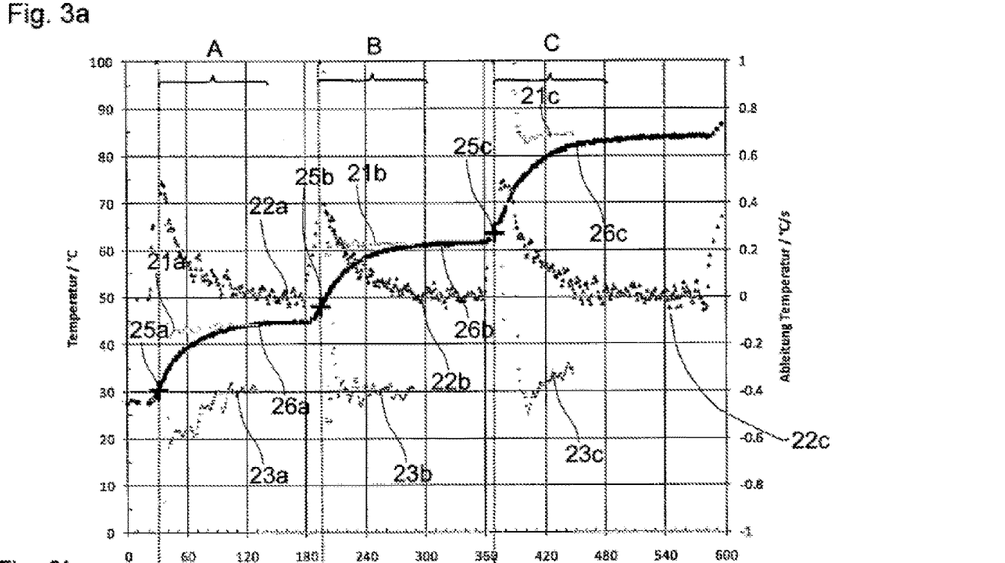
FIG. 3a shows the graphic representation of the temperature step response of a PT1-element as a function of the resonant frequency.
Figure 3B:
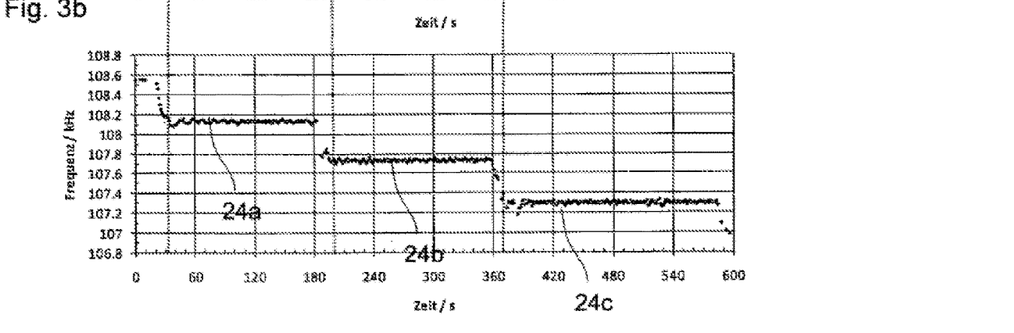

FIGS. 3a and 3b show a calibration process referred to an arrangement according to FIG. 1. In the present example, an ideal thermal contact is present between the glass-ceramic panel and the cooking pan. The calibration process comprises the determination of three temperature calibration values from three calibration steps A-C. Each calibration step A-C is associated with the heating of the cooking pan to the next higher and constantly maintained temperature level. This is rendered again by the resonant frequencies of the resonant circuit shown in FIG. 3b, which abruptly decrease in each case to a lower level upon the introduction of a temperature step and levels off again and remains constant at the lower level. During introduction of such a temperature step, the temperature of the glass-ceramic panel reacts like a PT1-element (Equation 1), as this is shown in FIG. 3a graphically by the time course of the measured temperature values 26a . . . c of the temperature sensor. The respective calibration step is first introduced at a time point

25a . . . c, at which the resonance frequency 24a . . . c has adjusted to a constant value. Therefore, in this example, the first measured temperature values are only included in the calculations with a certain delay, i.e., after the temperature increase detected by the temperature sensor has already occurred.

The respective final value of the measured temperature values 26a . . . c of a calibration step that corresponds to the temperature of the cooking pan is newly calculated continuously from the measured temperature values 26a . . . c according to the above instructions. The calculated final values 21a . . . c are also shown in FIG. 3a. The calculated final values 21a . . . c continually approach the actual final value with increasing number of measured temperature values 26a . . . c. As soon as the calculated final values 21a . . . c have leveled off sufficiently, the calibration step is terminated and the next calibration step is introduced or the calibration process is stopped. In order to establish the time point when the calculated final value has approximated the effective final value with sufficient precision, programming means are provided, which analyze the course of the calculated final values with corresponding algorithms. Decision criteria include, for example, the measurement of the scatter of values around an average. As soon as the scatter of the calculated final values has decreased to a minimum, this is an indication that the calculated final value lies in the vicinity of the effective final value. Thus, for example, according to FIGS. 3a-b, in calibration step A, even after approximately 15 s, the final value is calculated with sufficient precision. In calibration step C, it lasts approximately 30 s. This is because in the third step it takes longer for the resonant frequency to adjust to a constant value.

Under ideal conditions, i.e., in the case of an ideal heat-conducting contact between cooking pan and glass-ceramic panel, a temperature calibration is even possible within 30 s. This is the case then when both the cooking pan and the glass-ceramic panel are found at ambient temperature and the first calibration value can be derived from the initial conditions, as explained above. The second calibration value is then present after approximately 20 s. With more unfavorable conditions the calibration can last up to 60 s.

The points 22a . . . c further show the first derivative y'(t) of the measured temperature values determined by calculation. The points 23a . . . c show the continuously calculated approximate value of T.

Figure 4A:
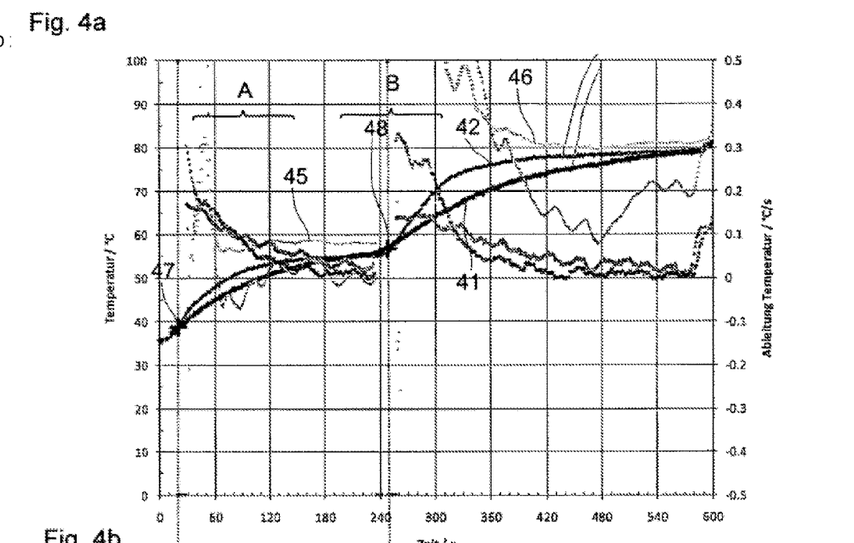
FIG. 4a shows the graphic representation of the temperature step response of a PT2-element as a function of the resonant frequency.
Figure 4B:
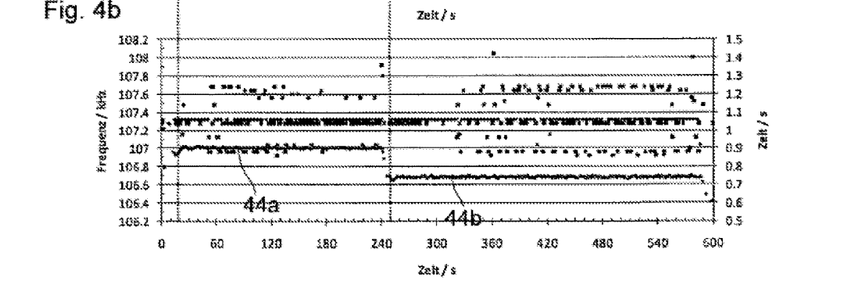

FIGS. 4a-b show the step response of two different temperature measurement sensors as a reaction to an abrupt increase of the temperature of the cooking pan that occurs twice. In both cases, the resonant frequency adjusts to a constant value 44a or 44b, as is shown in FIG. 4b. In contrast to the arrangement according to FIGS. 3a-b, the cooking pan contacts the glass-ceramic panel clearly more poorly in the region of a first temperature sensor. This temperature sensor supplies the first temperature measurement curve 41. In the region of a second temperature sensor, which supplies a second temperature measurement curve 42, the contact is already better, but it is still poorer than in the arrangement according to FIG. 3a. The poorer contact leads to the circumstance that the step response has an essentially flatter and delayed course, and therefore, it takes longer for the effective final value to be reached. In order to be able to calculate a sufficiently precise final value, essentially more measured temperature values are required for such an arrangement, which causes a correspondingly longer measurement phase. Thus, for example, in calibration step A (starting point 47), it lasts approximately 45 s (calculated final values 45), and in calibration step B (starting point 48), it takes approximately 120 s of measurement time (calculated final values 46) until a sufficiently precise final value is calculated. Care must be taken here that the next temperature step has been carried out each time prior to reaching the final temperature, so that the measured temperature values of curves 41 and 42 do not represent the respective final temperature.

For a temperature calibration that is as rapid as possible, it is thus important that a good heat contact between cooking pan and glass-ceramic panel exists, at least in the region of the temperature sensor. Therefore, it is of advantage to place each of the temperature sensors in regions of the cooking zone in which the pan has a heat-conducting contact that is as optimal as possible with the glass-ceramic panel. For example, this may be in the edge region of the cooking zone, since the bottom of the cooking pan is frequently is inverted in the center and has a poor contact or even no contact with glass-ceramic panel. Preferably, several temperature sensors are disposed at different radial distances to the central point of the cooking zone. In this way, a temperature sensor always lies in a region with good heat contact with the cooking pan. Further, such an arrangement also takes into consideration cooking pans of different sizes. In the case of several temperature sensors, the control means of the induction device can evaluate the step responses of the individual temperature sensors and only measured temperature values of that temperature sensor or those temperature sensors that have a rapid step response and thus correspond rather to a PT1-element are drawn upon for a calibration process or calibration step. The temperature sensor may be a Pt sensor, such as a Pt 1000 sensor.

LIST OF REFERENCE NUMBERS

1 Induction cooking device
2 Glass-ceramic panel
3 Induction coil
4 Temperature sensor
5 Pan
6 Contents
7 Measuring coil
11 Linear characteristic
12 Temperature calibration values
21a . . . c Continuously calculated, determined final value of the temperature.
22a . . . c The first derivative y'(t) of the measured temperature values determined by calculation
23a . . . c Continuously calculated, approximate value of T
24a . . . c Resonant frequencies
25a . . . c Starting point for the introduction of a calibration step
26a . . . c Measured temperature values of the temperature sensor
41 First temperature measurement curve
42 Second temperature measurement curve
44a . . . b Resonant frequencies
45 Continuously calculated, determined final value of the temperature
46 Continuously calculated, determined final value of the temperature
47 Starting point for the introduction of a calibration step
48 Starting point for the introduction of a calibration step

What is claimed is:

1. An electrical device, comprising:
an article having inductive properties;
an induction coil for heating the article, so that a resonant circuit is created between the article and the induction coil;
a support panel comprising a top surface for supporting the article and a bottom surface, wherein the induction coil is disposed below the bottom surface;
a temperature sensor connected to the support element;
a measuring instrument for determining the temperature-dependent permeability of the article, or a resonant frequency that is dependent on the permeability, of the resonant circuit; and
a microprocessor for determining and regulating the temperature of the article, the microprocessor having an algorithm thereon,
wherein the microprocessor controls the measuring instrument to determine a temperature of the article by measuring the temperature-dependent permeability of the article or the resonant frequency,
wherein the microprocessor controls the temperature sensor to determine a temperature of the support element,
wherein the algorithm determines a direct or indirect relationship between the temperature and the permeability or resonant frequency of the article, and
wherein, from the temperature-dependent permeability or resonant frequencies, the algorithm determines an absolute temperature of the article via the direct or indirect relationship.

2. The electrical device according to claim 1, whereby the resonant frequency stands in a physical relationship with the temperature of the article via a mathematical function, and the mathematical function contains the temperature (T) and the resonant frequency (F) as variables, and the function is defined by determining at least two temperature calibration values of the article corresponding to at least two different resonant frequencies, wherein at least one temperature calibration value of the article is determined by the following:
the microprocessor controlling the induction heating element to heat the article to a higher temperature level and keeping the temperature constant at the higher temperature level;
the microprocessor controlling the temperature sensor to measure the temperature of the support element at least once at a time point at which the temperature is kept constant at the higher temperature level; and
the algorithm calculating the temperature calibration value, the calculation being based on a linear, time-invariant system (LTI system), whereby the temperature calibration value is calculated as the output variable of a transfer function of the LTI system from at least one temperature value measured by the temperature sensor on the support element as the input variable of the transfer function.

3. The electrical device according to claim 2, wherein the transfer function is a step response in the form of a PT1-element or a PT2-element.

4. The electrical device according to claim 3, wherein the at least one temperature calibration value, which corresponds to a final value of the step response, is calculated from measured temperature values that correspond to input variables of the step response, prior to when a final value of the step response is reached.

5. The electrical device according to claim 4, wherein the final value of the step response is determined from a plurality of measured temperature values by an approximation method.

6. The electrical device according to claim 5, wherein the approximation method is an iteration method.

7. The electrical device according to claim 5, wherein the approximation method is a method according to the method of least squares.

8. The electrical device according to claim 2, wherein a plurality of temperature calibration values are calculated, and the relationship between the temperature of the article and the resonant frequency, which is defined by the mathematical function, is determined via an approximation method.

9. The electrical device according to claim 2, wherein the temperature calibration values are determined at the beginning of heating the article, and, after determining the calibration values, the temperature of the article is regulated by regulating the resonant frequency.

10. The electrical device according to claim 1, whereby the resonant frequency stands in a physical relationship with the temperature of the article via a mathematical function, and the mathematical function contains the temperature (T) and the resonant frequency (F) as variables and the function is defined by determining at least two absolute temperature calibration values corresponding to two different resonant frequencies, at least one temperature calibration value of the article being determined by the following steps:
the microprocessor controlling the induction heating element to heat the article to a higher temperature level and keeping the temperature constant at the higher temperature level;
the microprocessor controlling the temperature sensor to measure the temperature of the support element a plurality of times over a time period during which the temperature is kept constant at the higher temperature level;
the algorithm calculating the temperature calibration value, the calculation being based on a linear, time-invariant system (LTI system), whereby the temperature calibration value is calculated as the output variable of the transfer function of the LTI system from several temperature values measured at certain time intervals by the temperature sensor on the support element as the input variables of the transfer function.

11. The electrical device according to claim 5, wherein the at least one temperature calibration value is calculated repeatedly over a time interval with the transfer function from the previously measured temperature values, and the calculations are continued until they result in a temperature calibration value that is approximated to the output variable or the final value of the transfer function.

12. The electrical device according to claim 1, wherein an increase in the temperature of the article is present in the form of a step function, so that the temperature of the support element corresponds to a step response to the step function.

13. The electrical device according to claim 1, wherein the temperature of the article is kept constant subsequent to a temperature increase by keeping the resonant frequency constant via a control loop.

14. The electrical device according to claim 1, wherein the article is a utensil for cooking, heating, thawing and/or keeping food warm.

* * * * *